United States Patent [19]
Peck et al.

[11] Patent Number: 5,873,631
[45] Date of Patent: Feb. 23, 1999

[54] COMBINED MECHANICAL AND INERTIAL LATCH FOR VEHICLE SEAT

[75] Inventors: Steven Peck, Highland; Matthew C. Bluntzer, Yipsilanti, both of Mich.

[73] Assignee: Lear Corporation, Southfield, Mich.

[21] Appl. No.: 632,933

[22] Filed: Apr. 16, 1996

(Under 37 CFR 1.47)

[51] Int. Cl.[6] .................................................... B60N 2/20
[52] U.S. Cl. ...................................... 297/378.11; 297/367
[58] Field of Search ..................................... 297/366, 367, 297/368, 378.11, 378.12, 238, 216.13

[56] References Cited

U.S. PATENT DOCUMENTS

| 4,206,946 | 6/1980 | Maertens . | |
|---|---|---|---|
| 4,382,630 | 5/1983 | Weston | 297/367 X |
| 4,438,974 | 3/1984 | Kresky et al. | 297/378.11 |
| 4,632,421 | 12/1986 | Shamie . | |
| 4,634,182 | 1/1987 | Tanaka | 297/378.11 |
| 4,667,492 | 5/1987 | Tomatsu et al. . | |
| 5,007,680 | 4/1991 | Miyanchi et al. | 297/378.12 |
| 5,044,683 | 9/1991 | Pärsson . | |
| 5,280,995 | 1/1994 | Elton . | |
| 5,286,084 | 2/1994 | Bart . | |
| 5,290,090 | 3/1994 | Bell et al. . | |
| 5,380,060 | 1/1995 | Sponsier et al. . | |
| 5,425,568 | 6/1995 | Sliney et al. | 297/378.11 |
| 5,449,216 | 9/1995 | Gierman et al. . | |
| 5,547,257 | 8/1996 | Hoshihara | 297/367 |

*Primary Examiner*—Peter R. Brown
*Attorney, Agent, or Firm*—MacMillan, Sobanski & Todd, LLC

[57] ABSTRACT

A motor vehicle includes a folding passenger seat assembly having a seat portion and a backrest portion. The backrest portion has a left end and a right end both of which are hinged to the seat portion so that the backrest portion can be folded from a vertical use position to a horizontal non-use position. A child safety seat is secured to the backrest portion. The left hinged end of the backrest portion is provided with a manual latch for selectively locking the left end of the backrest portion in the vertical use position. The right end of the backrest cushion is provided with an inertial latch for automatically locking the right end of the backrest portion in its vertical use position only in response to sudden deceleration of the motor vehicle. Weight, component cost and labor are conserved by installing the manual latch on only the left end of the backrest portion to lock it in its vertical use position. The backrest portion is freely folded to its non-use position by actuating the manual latch; the inertial latch only locks during sudden deceleration.

13 Claims, 4 Drawing Sheets

COMBINED MECHANICAL AND INERTIAL LATCH FOR VEHICLE SEAT

TECHNICAL FIELD

The subject invention relates to an improved inertial latch mechanism for locking the backrest of a vehicular seat assembly in a vertical use position.

BACKGROUND OF THE INVENTION

Passenger seat assemblies in motor vehicles are often designed with a backrest portion which folds or collapses to a generally horizontal non-use position for increased cargo carrying capacity. Usually these backrest portions are either freely pivotal between their vertical use position and horizontal folded position with an inertial latch provided in the event of sudden deceleration, or in the alternative are locked in the vertical use position with a manual latch requiring deliberate manipulation to release to the non-use position. The former option is considered more convenient and is usually less costly to manufacture. Inertial latches as used in motor vehicle seating applications are well known in the art. Examples of such may be had in U.S. Pat. No. 4,318,569 to Bilenchi et al., issued Mar. 9, 1982, and U.S. Pat. No. 5,100,202 to Hughes, issued Mar. 31, 1992.

SUMMARY OF THE INVENTION AND ADVANTAGES

According to the subject invention, a folding passenger seat assembly for a motor vehicle comprises a seat portion and a backrest portion. The backrest portion extends between a left and right end thereof. A hinge is provided for arcuately moving the backrest portion relative to the seat portion between a generally vertical use position and a generally horizontal folded position. A manual latch is associated with one of the left and right ends of the backrest portion for selectively locking the one end of the backrest portion in the vertical use position. An inertial latch is operatively associated with the other of the left and right ends of the backrest portion for automatically locking the other the end of the backrest portion in the vertical use position in response to sudden deceleration of the vehicle. Therefore, one end of the backrest portion is locked in the vertical use position by the manual latch and the other end is locked in place by the inertial latch but only during conditions of sudden vehicle deceleration.

By utilizing a traditional manual latch on only one end of the backrest portion to lock it in the vertical use position, as opposed to the prior art technique of a manual latch locking both ends of the backrest portion in the vertical use position, a significant savings in weight, component cost and labor are realized. Therefore, under normal conditions, the backrest portion can be pivoted to its folded position by simply actuating the manual latch because the inertial latch remains unlocked at all times until sudden deceleration of the vehicle. In such instances of sudden deceleration, the inertial latch then locks the one end of the backrest portion in its vertical use position while the manual latch locks the other end of the backrest portion in the vertical use position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
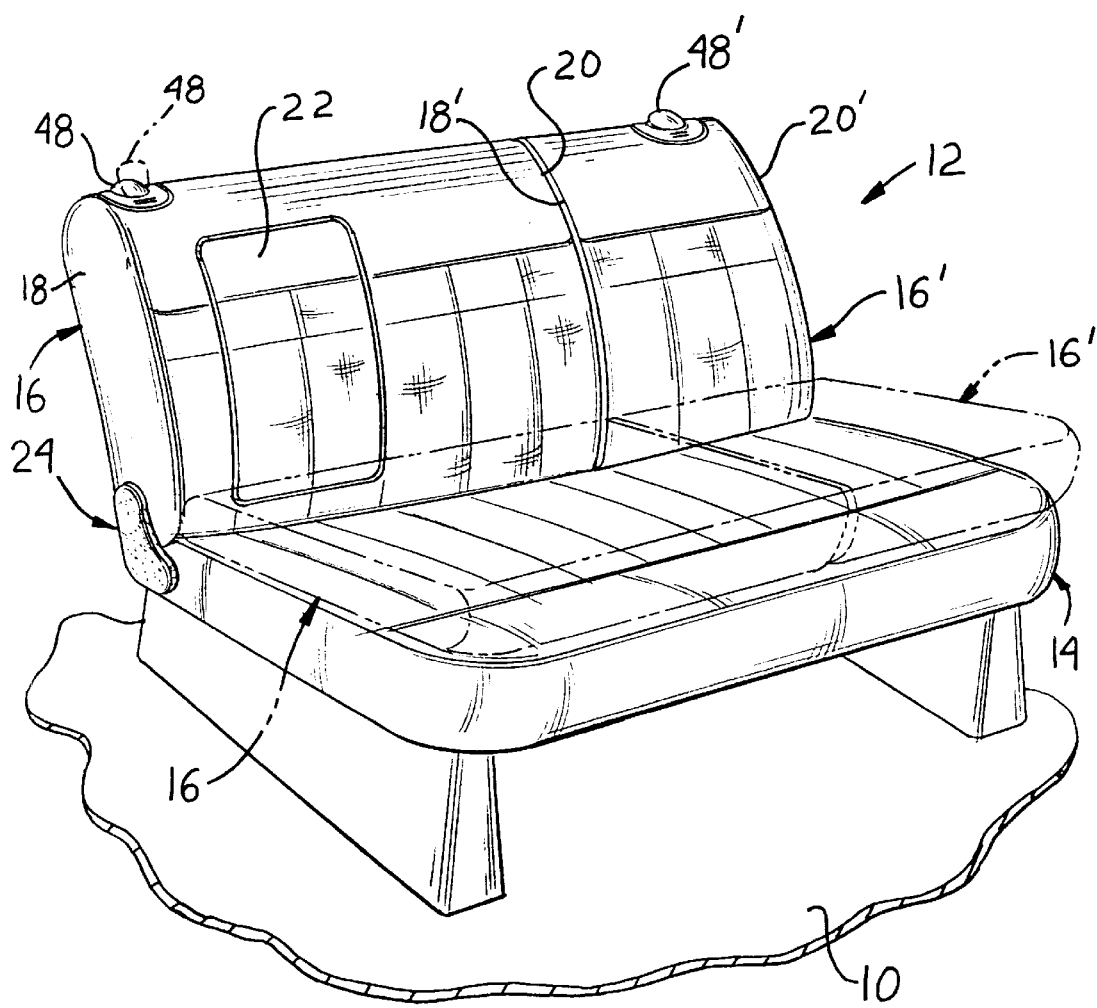
FIG. 1 is a simplified perspective view of a motor vehicle seat assembly according to the subject invention showing the two backrest portions folded to a generally horizontal folded position in phantom.

Referring to the Figures, wherein like numerals indicate like or corresponding parts throughout the several views, the subject invention pertains to a typical motor vehicle having a passenger compartment, the floor of which is indicated at 10. Secured to the floor 10 in the passenger compartment of the motor vehicle is a folding passenger seat assembly, generally shown at 12. The seat assembly 12 includes a seat portion, generally indicated at 14, and a backrest portion, generally indicated at 16. The backrest portion 16 has a left end 18 and a right end 20. As shown in FIG. 1, the backrest portion 16 is preferably of the so-called 60/40 split type including a companion backrest portion 16' of unequal length which can be independently manipulated. Alternatively, the backrest portion 16 may be of the traditional full length one piece type (not shown) which is coextensive with the seat portion 14.

In the case of the preferred 60/40 split type, those skilled in the art will appreciate that both the backrest portion 16 and its companion backrest portion 16' will have a left end 18, 18' and a right end 20, 20', respectively, and that the subject invention may be practiced on either one or both of the backrest portions 16, 16'. However, the specific components of the seat assembly 12 which are described below with reference to the left end 18 or the right end 20 will generally be reversed in connection with the companion backrest portion 16'. This is because the outboard end of the backrest portion 16 is the left end 18, whereas the outboard end of the companion backrest portion 16' is the right end 20', as viewed from FIG. 1. Similarly, the inboard end of the backrest portion 16 is the right end 20, whereas the inboard end of the companion backrest portion 16' is the left end 18'. The backrest portion 16 shown in FIG. 1 preferably includes an integral fold-down child safety seat 22.

Figure 2:
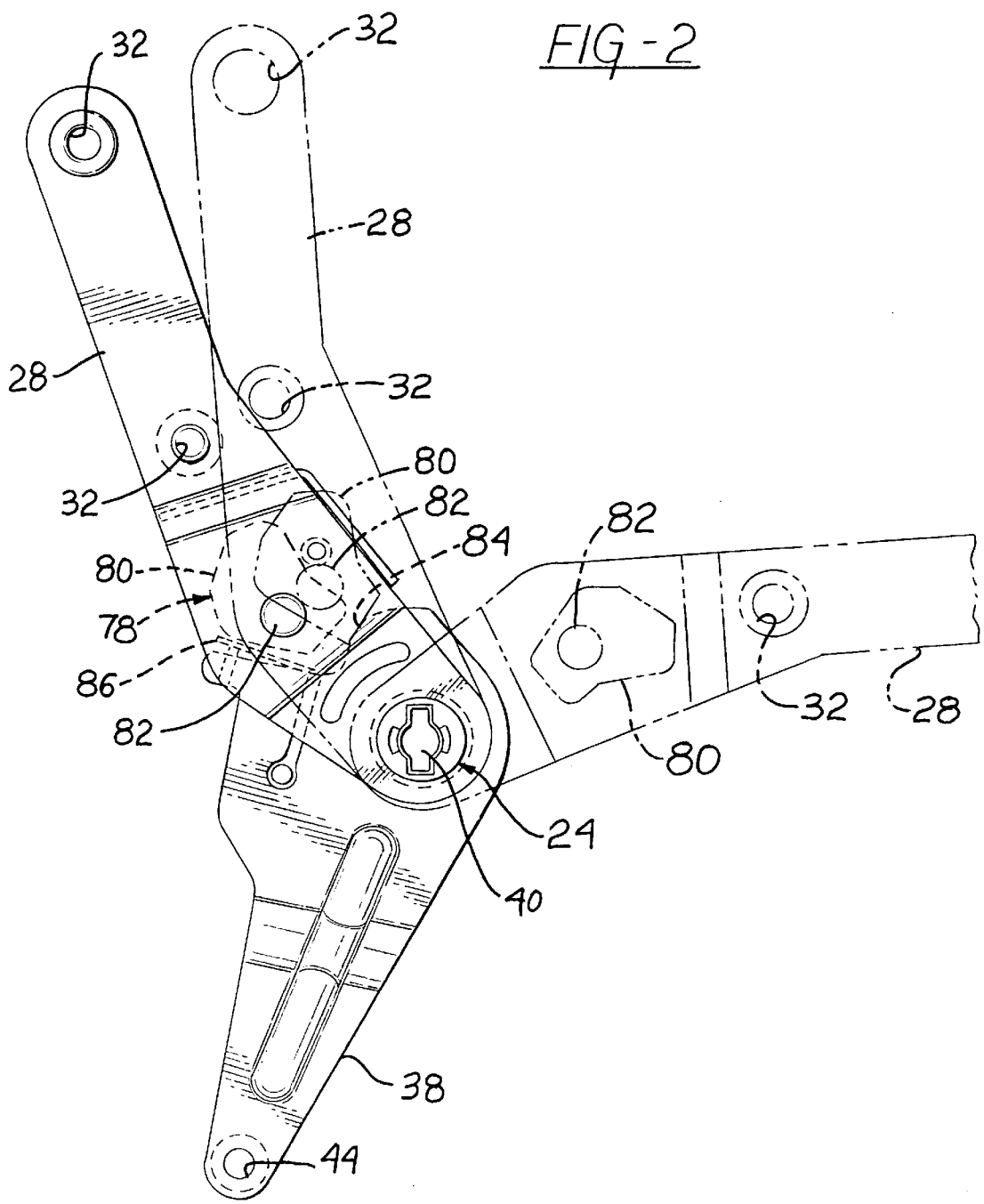
FIG. 2 is a side view of the right top and right bottom bracket arms and the inertial latch of the subject invention.
Figure 3:
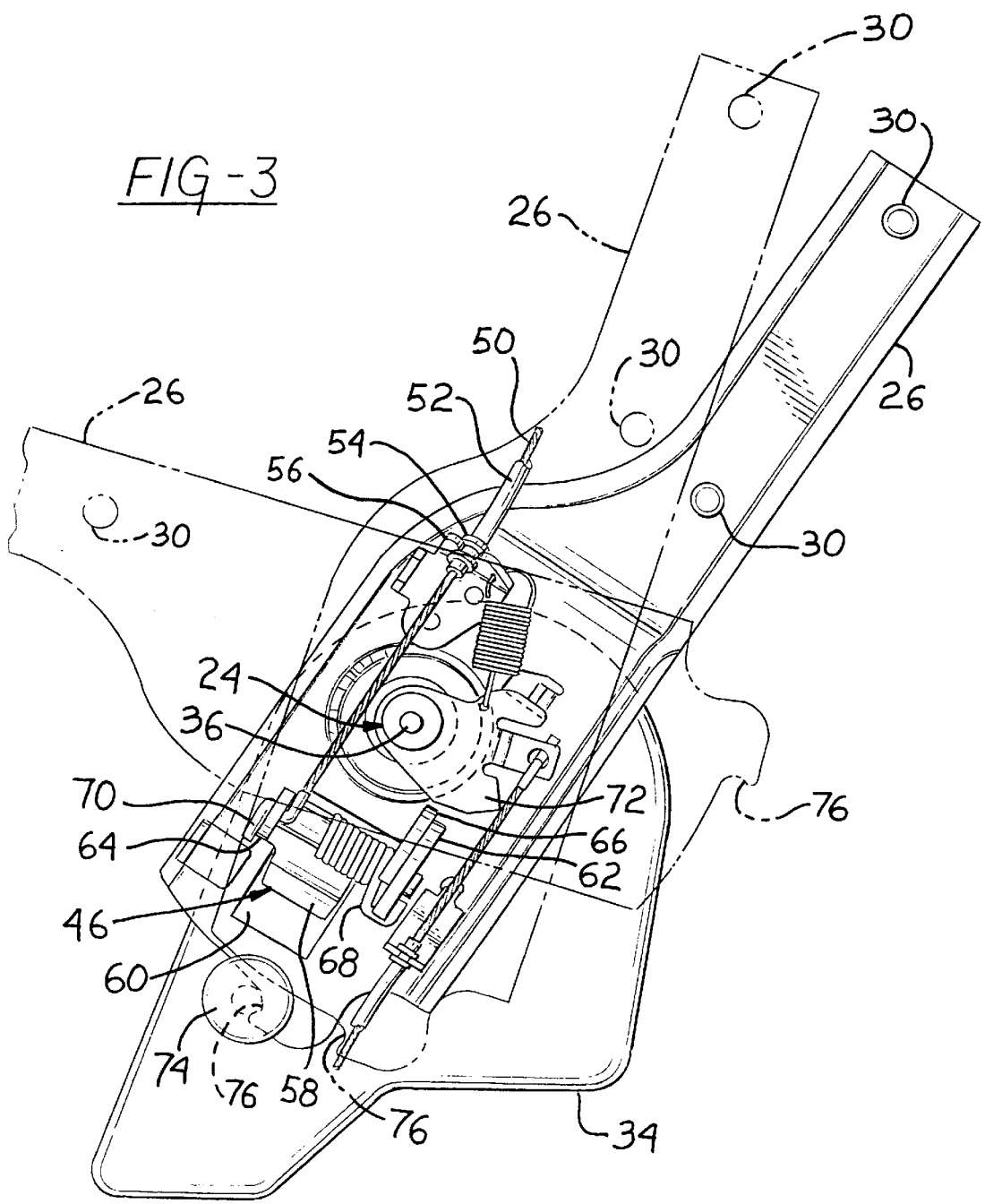
FIG. 3 is a side view of the left top and left bottom bracket arms and the manual latch of the subject invention.
Figure 4:
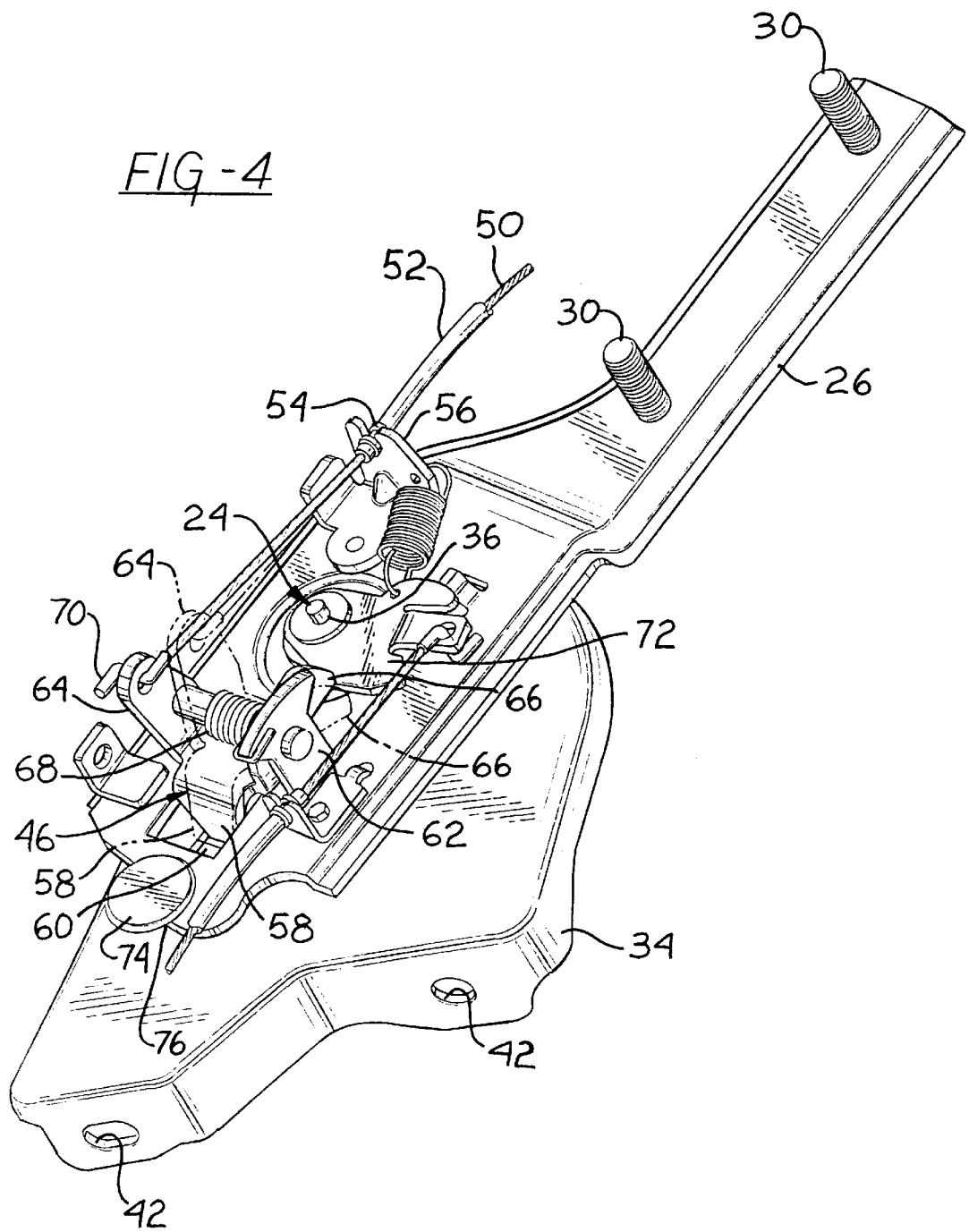
FIG. 4 is a perspective view of the left top and left bottom bracket arms and the manual latch, with the manual latch shown in an unlocked condition it phantom.

The seat assembly 12 includes a hinge, generally indicated at 24, for arcuately moving the backrest portion 16 relative to the seat portion 14 between a generally vertical use position and a generally horizontal folded position (shown in phantom in FIG. 1). The hinge 24 may take any of various forms known to those skilled in the art, but preferably includes a left top bracket arm 26 fixedly attached to the left end 18 of the backrest portion 16 and a right top bracket arm 28 fixedly attached to the right end 20 of the backrest portion 16. The left top bracket arm 26 is shown in FIG. 3 and 4, whereas the right top bracket arm is shown in FIG. 2. A pair of threaded studs 30 extend from the left top bracket arm 26 to facilitate connection to the backrest portion 16, whereas the right top bracket arm 28 includes a pair of apertures 32 through which threaded fasteners (not shown) attach to the backrest portion 16.

The hinge 24 also includes a left bottom bracket arm 34 pivotally attached to the left top bracket arm 26 by a hinge pin 36 and a right bottom bracket arm 38 pivotally attached to the right top bracket arm 28 by a hinge pin 40. Depending upon the particulars of the motor vehicle construction and the seat portion 14 construction, the left 34 and right 38 bottom bracket arms may be attached directly to the floor 10 in the passenger compartment, or attached to the seat portion 14, which in turn is attached to the floor 10. In FIGS. 3 and 4, the left bottom bracket arm 34 is shown including a pair of mounting holes 42. In FIG. 2, the right bottom bracket arm 38 is shown including a single mounting hole 44. Preferably, the top and bottom bracket arms on both the left and right sides are fabricated from a heavy gauge metal stamping.

A manual latch, generally indicated at 46 in FIGS. 3 and 4, is associated with the left end 18 of the backrest portion 16 for selectively locking the left end 18 of the backrest portion 16 in the vertical use position. The manual latch 46 includes a remote actuating lever 48 disposed conveniently on the backrest portion 16. As shown in FIG. 1, the remote actuating lever 48 may be positioned along the top edge of the backrest portion 16 for ready access to actuate the manual latch 46 so that the backrest portion 16 can be folded to a non-use position. Of course, those skilled in the art will readily appreciate various other mounting locations and possible alternative embodiments for the remote actuating lever 48. The companion backrest portion 16' includes a remote actuating lever 48' positioned along its top edge adjacent the right end 20' thereof.

A flexible motion transmitting core element 50 operatively extends from the remote actuating lever 48. The core element 50 is preferably disposed within a protective sheath-like conduit 52. The conduit 52 may be of the composite type having an inner tubular liner defining the internal boundaries of a core passage, at least one metallic supportive lay wire wrapped helically about the liner, and an outer cover disposed about the lay wire. The conduit 52 includes end fittings, one of which is indicated at 54 in FIGS. 3 and 4, attached in a small holder 56 on the right top bracket arm 28. As the remote actuating lever 48 is manipulated, shown in phantom in FIG. 1, the core element 50 is tensioned and displaced within the conduit 52, thus causing the end of the core element 50 extending from the end fitting 56 to be drawn up toward the end fitting 56.

In FIGS. 3 and 4, the manual latch 46 is shown including a latch finger 58 moveably supported on the left top bracket arm 26. A catch 60 is formed in the left bottom bracket arm 34 for trapping the latch finger 58 in a locked condition to lock the backrest portion 16 in the vertical use position. That is, when the latch finger 58 is seated in the catch 60, the top 26 and bottom 34 bracket arms are immobilized relative to one another such that no rotation about the hinge pin 36 is possible. This, in turn, locks the left end 18 of the backrest portion 16 in the vertical use position.

The latch finger 58 is pivotally carried on a yoke support 62 which, in turn, is fixedly mounted on the left top bracket arm 26. A crank 64 extends from the latch finger 58 along with an interlock tab 66. The yoke support 62 includes a return spring 68 for continuously urging the latch finger 58 toward the locked condition seated in the catch 60. The core element 50 includes an S-shaped (or other) terminal 70 operatively connected to the crank 64 for controlling movement of the latch finger 58. That is, as the remote actuating lever 48 is manipulated, the core element 50 is drawn into the conduit 52, causing the terminal 70 to pull the crank 64 and thereby pivot the latch finger 58 out of the catch 60 so that the backrest portion 16 can be folded to the non-use position.

As soon as the remote actuating lever 48 is released, the return spring 68 urges the components in the opposite direction, but may be ineffectual if the backrest portion 16 has been moved from the vertical use position because the latch finger 58 will be out of registry with the catch 60. If this is the case, the interlock tab 66 will be held in a deflected condition (shown in phantom in FIG. 4), thereby preventing separate actuation of the child safety seat 22 via a control plate 72 mounted on the hinge pin 36. However, when the backrest portion 16 is returned to the vertical use position, the latch finger 58 will automatically snap into the catch 60, once again locking the left end 18 of the backrest portion 16 in the vertical use position. A post 74 extending from the left bottom bracket arm 34 abuts a hook 76 on the left top bracket arm 26 to prevent hyper-extension of the backrest portion 16.

An inertial latch, generally indicated at 78 in FIG. 2, is operatively associated with the right end 20 of the backrest portion 16 for automatically locking the right end 20 in the vertical use position in response to sudden deceleration of the vehicle. Therefore, while the manual latch 46 is effective to secure the left end 18 of the backrest portion 16 in the vertical use position, the inertial latch 78 functions in concert to secure the right end 20 in the vertical use position, but only in an emergency situation.

The inertial latch 78 includes a pendulum 80 pivotally supported on the right top bracket arm 28. The pendulum 78 is freely pivotally supported by an axle 82 held in the right top bracket arm 28. The center of mass of the pendulum is located above the axle 82 when the backrest portion 16 is in its vertical use position. A stop ledge 84 projects from the right bottom bracket arm 38 to abut the pendulum 80 whenever the pendulum 80 has been rotated forwardly due to inertial forces caused by sudden deceleration. Therefore, in the event of sudden deceleration of the motor vehicle, inertial forces acting upon the pendulum 80 will cause it to tip forwardly, as shown in phantom in FIG. 2, thereby wedging against the stop ledge 84 and effectively locking the right top 28 and bottom 38 brackets arms to one another in the vertical use position. A preset spring 86 is attached to the right bottom bracket arm 38 for automatically shifting the pendulum 80 toward a forward tilted condition, i.e., toward the stop ledge 84, when the backrest portion 16 is in the vertical use position. Those skilled in the art will readily understand that when the backrest portion 16 is moved toward the folded position, under normal conditions, the pendulum will rotate under gravity approximately 45° in a counterclockwise direction as viewed from FIG. 2 to clear the stop ledge 84.

By using the manual latch 46 on only one end 18 of the backrest portion 16 to lock it in its vertical use position, a significant savings in weight, component cost and labor are realized. Therefore, under normal conditions, the backrest portion 16 can be freely pivoted to its folded position by simply actuating the manual latch 46 (via the remote actuating lever 48) because the inertial latch 78 remains unlocked at all times except during sudden deceleration. In the event of sudden deceleration, the inertial latch 78 then locks the right end 20 of the backrest portion 16 in its vertical use position while the manual latch 46 locks the left end 18 of the backrest portion 20 in its vertical use position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A folding passenger seat assembly for a motor vehicle, said assembly comprising:

a seat portion;

a backrest portion extending between a left and right end thereof;

a hinge for arcuately moving said backrest portion relative to said seat portion between a generally vertical use position and a generally horizontal folded position, said hinge including a left top bracket arm fixedly attached to said left end of said backrest portion and a right top bracket arm fixedly attached to said right end of said backrest portion, and a left bottom bracket arm pivotally attached to said left top bracket arm by a hinge pin and a right bottom bracket arm pivotally attached to said right top bracket arm by a hinge pin;

a manual latch associated with one of said left and right ends of said backrest portion for selectively locking said one end of said backrest portion in said vertical use position, said manual latch including a latch finger moveably supported on one of said left and right top bracket arms, and a catch fixedly disposed in one of said respective left and right bottom bracket arms for trapping said latch finger in a locked condition, a remote actuating lever for controlling movement of said latch finger, and a flexible motion transmitting core element operatively interconnecting said remote actuating lever and said latch finger;

and an inertial latch operatively associated with the other of said left and right ends of said backrest portion for automatically locking the other said end of said backrest portion in said vertical use position in response to sudden deceleration of the vehicle.

2. An assembly as set forth in claim 1 wherein said remote actuating lever is disposed on said backrest portion and said latch finger is disposed on one of said left and right top bracket arms.

3. An assembly as set forth in claim 2 wherein said latch finger is pivotally carried on a yoke support; said yoke support fixedly supported on one of said left and right top bracket arms.

4. An assembly as set forth in claim 3 wherein said yoke support includes a return spring continuously urging said latch finger toward said locked condition relative to said catch.

5. An assembly as set forth in claim 3 wherein said latch finger includes a crank, and said core element includes a terminal end operatively connected to said crank.

6. An assembly as set forth in claim 1 wherein said inertial latch includes a pendulum pivotally supported on one of said top, and bottom, bracket arms at one of said left and right ends, and a stop ledge disposed in the other of said top, and bottom, bracket arms.

7. An assembly as set forth in claim 6 wherein said pendulum is pivotally supported by an axle on said top bracket arm, at one of said left and right ends of said backrest portion, said stop ledge being disposed on the respective one of said bottom bracket arms.

8. An assembly as set forth in claim 7 wherein said pendulum includes a center of mass located above said axle when said backrest portion is in said vertical use position.

9. An assembly as set forth in claim 8 further including a pendulum preset spring for urging said pendulum toward said stop ledge when said backrest portion is in said vertical use position.

10. A motor vehicle including a folding passenger seat assembly, said motor vehicle comprising:

a passenger compartment;

a seat assembly disposed in said passenger compartment;

said seat assembly including a seat portion and a backrest portion having a left and right end;

a child safety seat secured to said backrest portion;

a hinge disposed in said passenger compartment for arcuately moving said backrest portion relative to said seat portion between a generally vertical use position and a generally horizontal folded position, said hinge including a left top bracket arm fixedly attached to said left end of said backrest portion and a right top bracket arm fixedly attached to said right end of said backrest portion, and a left bottom bracket arm pivotally attached to said left top bracket arm by a hinge pin and a right bottom bracket arm pivotally attached to said right top bracket arm by a hinge pin,;

a manual latch associated with one of said left and right ends of said backrest portion for selectively locking said one end of said backrest portion in said vertical use position, said manual latch including a latch finger moveably supported on one of said left and right top bracket arms, a catch fixedly disposed in one of said respective left and right bottom bracket arms, a remote actuating lever for controlling movement of said latch finger, and a flexible motion transmitting core element operatively interconnecting said remote actuating lever and said latch finger,;

and an inertial latch operatively associated with the other of said left and right ends of said backrest portion for automatically locking the other said end of said backrest portion in said vertical use position in response to sudden deceleration of said motor vehicle.

11. A motor vehicle as set forth in claim 10 wherein said inertial latch includes a pendulum pivotally supported by an axle on one of said left and right top bracket arms, and a stop ledge disposed on the respective one of said left and right bottom bracket arms.

12. A motor vehicle as set forth in claim 11 wherein said pendulum includes a center of mass located above said axle when said backrest portion is in said vertical use position.

13. A motor vehicle as set forth in claim 12 further including a pendulum preset spring for urging said pendulum toward said stop ledge when said backrest portion is in said vertical use position.

* * * * *